United States Patent [19]
Anastasie

[11] Patent Number: 4,747,896
[45] Date of Patent: May 31, 1988

[54] PROTECTIVE COMPOSITE GLASS AND METHOD OF MANUFACTURING THEREOF

[76] Inventor: Maurice G. E. Anastasie, 4, rue Changarnier, 75012 Paris, France

[21] Appl. No.: 834,124

[22] Filed: Feb. 26, 1986

Related U.S. Application Data

[62] Division of Ser. No. 574,864, Jan. 30, 1984, abandoned.

[30] Foreign Application Priority Data

Feb. 4, 1983 [FR] France .................. 83 01751
Sep. 21, 1983 [FR] France .................. 83 14988

[51] Int. Cl.⁴ ............................................. B32B 31/00
[52] U.S. Cl. ..................................... 156/85; 156/101; 156/103; 156/105; 156/106; 156/153; 156/267; 156/323; 428/412; 428/425.3; 428/423.7; 428/430; 428/437
[58] Field of Search ................. 156/85, 267, 153, 323, 156/101, 105, 103, 106; 428/425.3, 423.7, 412, 437, 430

[56] References Cited

U.S. PATENT DOCUMENTS

| | | | |
|---|---|---|---|
| 1,841,689 | 1/1932 | Watkins | 156/106 |
| 1,921,612 | 8/1933 | Fraser et al. | 156/105 |
| 2,084,113 | 6/1937 | Sherts | 49/81 |
| 2,303,151 | 11/1942 | Watkins et al. | 156/101 |
| 3,388,032 | 6/1968 | Saunders | 161/183 |
| 3,620,896 | 11/1971 | Glasgow | 156/85 |
| 3,657,057 | 4/1972 | Shorr et al. | 428/412 |
| 3,789,192 | 1/1974 | Spindler | 219/522 |
| 3,971,668 | 7/1976 | Pickard et al. | 156/106 |
| 4,073,986 | 2/1978 | Keslar et al. | 428/38 |
| 4,121,014 | 10/1978 | Shoffer | 428/412 |
| 4,218,500 | 8/1980 | Rädisch | 428/430 |
| 4,243,719 | 1/1981 | Holmes | 428/412 |
| 4,358,329 | 11/1982 | Masuda | 428/430 |
| 4,364,786 | 12/1982 | Smith, Jr. et al. | 428/412 |
| 4,424,411 | 1/1984 | Clabburn | 174/84 R |

FOREIGN PATENT DOCUMENTS

| | | |
|---|---|---|
| 985152 | 3/1976 | Canada . |
| 0085602 | 1/1982 | European Pat. Off. . |
| 85602 | 8/1983 | European Pat. Off. . |
| 57-46821 | 3/1982 | Japan .................. 156/153 |

*Primary Examiner*—John J. Gallagher
*Attorney, Agent, or Firm*—Sandler & Greenblum

[57] ABSTRACT

A protective superposed layer composite glass structure includes at least one glass plate, a polyurethane film, and a polyvinyl butyral sheet between the glass plate and the polyurethane film for attaching the polyurethane sheet to the glass plate. A polycarbonate plate is superposed against the polyurethane film. Alternatively, a polyester sheet can be superposed against the polyurethane film. A process for making a superposed layer composite glass structure includes surrounding the various layer elements with bands formed of a thermo-retractable material, calendering the layered elements surrounded by the bands at a temperature approximately in the range of 120° to 200° C. and subsequently subjecting the layered elements surrounded by the bands to the action of an autoclave at a temperature approximately in the range of 120° to 200° C. under a pressure approximately in the range of 10 to 15 bars. The polyvinyl butyral sheet and the polyurethane film can be woven to include projecting surfaces on either or both surfaces.

20 Claims, 2 Drawing Sheets

PROTECTIVE COMPOSITE GLASS AND METHOD OF MANUFACTURING THEREOF

This application is a division, of application Ser. No. 574,864, filed Jan. 30, 1984, now abandoned.

FIELD OF THE INVENTION

The present invention relates to composite protective glass structures for protection against shocks and balls, and particularly, to superposed layer structures formed of glass plates, a plastic sheet and a polycarbonate or polyester plate or sheet.

BACKGROUND OF THE INVENTION

European Patent Application No. 41 090, in the name of the instant inventor, discloses a composite safety glass which includes, in addition to the above, a polyester sheet between superposed glass and polycarbonate plates.

In the glass structure described in this European application, the polyester sheet is glued to the polycarbonate plates by means of an acrylic resin and is glued to the glass plates by means of a sheet of polyvinyl butyral (PVB).

Numerous tests have been ascertained that attachment of the polyester sheet by means of PVB is not satisfactory because it is very difficult to make PVB adhere perfectly to a sheet of polyester.

Moreover, it has also been noted that, disadvantageously, during calendering of the superposed layer or "sandwich" assembly to make the PVB adhere to both the glass and polycarbonate plates, the polycarbonate plate has a tendency to deform.

SUMMARY OF THE INVENTION

It is an object of the present invention to provide a protective superposed layer composite glass and process of manufacturing the same wherein the above-described deficiencies inherent to heretofore known composite glass structures and manufacturing methods are substantially overcome.

According to the present invention, there is provided a composite protective glass which includes a first glass plate, a first polyurethane film superposed with the first glass plate and a first polyvinyl butyral sheet disposed between the first glass plate and the first polyurethane film for attaching the first polyurethane sheet to the first glass plate. A polycarbonate plate can be provided which is superposed with said first polyurethane film. The first glass plate can be laminated. The first polyurethane film can be formed of a material selected from the group consisting of polyether or polyester aliphatic polyurethane.

The composite protective glass according to the present invention can also include a second glass plate, a second polyurethane film superposed with the second glass plate, and a second polyvinyl butyral sheet disposed between the second glass plate and the second polyurethane film for attaching the second polyurethane film to the second glass plate, the polycarbonate plate being superposed with the second polyurethane film.

The composite protective glass according to the present invention can, alternatively to the aforementioned polycarbonate plate, include a polyester sheet superposed with the first polyurethane film. The polyester sheet can have a thickness of approximately 175 to 600 microns. This composite protective glass can also include a second glass plate, a second polyurethane film superposed with the second glass plate, and a second polyvinyl butyral sheet disposed between the second glass plate and the second polyurethane film for attaching the second polyurethane sheet to the second glass plate, the polyester sheet being superposed with the second polyurethane film.

The first and second polyvinyl butyral sheets can be approximately 0.4 millimeters thick. The first and second glass plates can be approximately 6 to 50 millimeters thick. The polycarbonate plate can be at least approximately 2 millimeters thick, and preferably, is approximately 3 millimeters thick.

The first glass plate can include a plurality of superposed glass plates, with a polyurethane film being disposed between each pair of adjacent glass plates. Alternatively, the first glass plate can include a plurality of superposed glass plates, with a polyvinyl butyral film being disposed between each pair of adjacent glass plates.

The composite protective glass according to the present invention can also include a second glass plate superposed with the first glass plate, a second polyvinyl butyral sheet disposed between and attaching the first and second glass plates to each other, a third glass plate superposed with the second glass plate, and a third polyvinyl butyral sheet disposed between and attaching the second and third glass plates to each other, the polycarbonate plate having a thickness approximately in the range of 500 microns to 12 millimeters, the first polyurethane film having a thickness of approximately 0.45 millimeters, the first polyvinyl butyral sheet having a thickness approximately in the range of 1.52 to 3.04 millimeters, the first and second glass plates each having a thickness approximately in the range of 10 to 15 millimeters, the second and third polyvinyl butyral sheets each having a thickness of approximately 0.38 millimeters and the third glass plate having a thickness approximately in the range of 3 to 5 millimeters.

The first polyvinyl butyral sheet can be hatched or roughened on one or both surfaces. Also, the first polyurethane film can be smooth on at least one surface, the at least one smooth surface of the first polyurethane film abutting a hatched or roughened surface of the first polyvinyl butyral sheet. Alternatively, the first polyurethane film can be hatched or roughened on at least one surface, the at least one hatched or roughened surface of the first polyurethane film abutting a hatched or roughened surface of the first polyvinyl butyral sheet. Also alternatively, the first polyurethane film can be hatched or roughened on both surfaces. In the embodiment in which first and second polyvinyl butyral sheets are provided, either or both such sheets can be woven on one or both their respective surfaces. In such embodiment, the first and second polyurethane films can be woven on one surface and smooth on their opposing surface, with their respective smooth or woven surfaces abutting woven surfaces of the first and second polyvinyl butyral sheets respectively. Alternatively, in such embodiment, the first and second polyurethane films can be woven on their respective both surfaces.

According to the present invention, there is also provided a process for making a protective superposed layer composite glass structure which includes providing a superposed layer assembly including a first glass plate, a first polyurethane film superposed with the first glass plate, a first polyvinyl butyral sheet disposed between the first glass plate and the first polyurethane film for attaching the first polyurethane sheet to the first glass plate, and surrounding the superposed layer assembly with at least two bands formed of a thermo-retractable material. The bands can be spaced approximately in the range of 80° to 100° with respect to each other around the superposed layer assembly. The bands can be formed of a glass material and can include an adhesive surface.

The process according to the present invention can also include calendering the superposed layer assembly surrounded by the bands and subsequently subjecting the superposed layer assembly surrounded by the bands to the action of an autoclave. The superposed layer assembly surrounded by the bands can be calendered at a temperature approximately in the range of 120° to 200° C., and can be subjected to the action of the autoclave at a temperature approximately in the range of 120° to 200° C. under a pressure approximately in the range of 10 to 15 bars. The process can further include providing a polycarbonate plate on one end of the superposed layer assembly and attaching a rigid plate formed of a material through which infrared radiation can pass to the exterior surface of the polycarbonate plate prior to surrounding the superposed layer assembly and the polycarbonate plate with the aforementioned bands. The rigid plate can be approximately at least 4 millimeters thick.

According to the present invention, there is also provided a process for making a protective composite superposed layer glass structure which includes providing a first superposed layer assembly which includes a first glass plate, a first polyurethane film superposed with the first glass plate, a first polyvinyl butyral sheet disposed between the first glass plate and the first polyurethane film for attaching the first polyurethane sheet to the first glass plate and a polycarbonate plate superposed against the first polyurethane film. This method includes placing a rigid plate against the polycarbonate plate, the plate being formed of a material through which infrared radiation can pass. The rigid plate can be made of glass. The method also includes calendering the first assembly and the rigid plate, e.g., in a calendering oven, providing a second superposed layer assembly which includes the first superposed layer assembly, a third glass plate superposed with the first glass plate and a second polyvinyl butyral sheet disposed between the first glass plate and the third glass plate for attaching the first and third glass plates to one another, calendering the second superposed layer assembly, e.g., in a calendering oven, and subjecting the second superposed layer assembly to the action of an autoclave. The method can also include, after the aforementioned step of calendering the first superposed layer of assembly and the rigid plate, subjecting the first superposed layer assembly and the rigid glass plate to the action of an autoclave.

The third glass plate can be laminated.

The first and second superposed layer assemblies can be subjected to the autoclave such that the autoclave is initially pressurized and subsequently successive temperature levels are created therein. The autoclave can be pressurized approximately in a range of 8 to 15 bars and subsequently three successive temperature levels can be created therein, the the first temperature level being approximately 100° C.; the second temperature level being approximately 120° C., and the third temperature level being approximately 130° C. The first temperature level can have a duration of approximately ten minutes, the second temperature level can have a duration of approximately fifteen minutes and the third temperature level can have a duration of approximately in the range of forty to fifty minutes. The pressure is the autoclave can be slowly lowered after the termination of the third temperature level while the first or second superposed layer assembly respectively remains therein.

The first and second superposed layer assemblies can be provided such that the first and second polyvinyl butyral sheets and the first polyurethane film extend beyond the edges of the first and third glass plates, the polycarbonate plate and the rigid glass plate, with the extending portions of the first and second polyvinyl butyral sheets and the first polyurethane film being removed after each of the aforementioned calendering steps.

The process according to the present invention can include providing the first superposed layer assembly with a first polyvinyl butyral sheet woven on one or both surfaces. Also, a first polyurethane film can be provided which is woven on one surface and smooth on its opposing surface, the smooth surface of the first polyurethane film abutting the first polyvinyl butyral sheet. Alternatively, the hatched or roughened surface of the first polyurethane film can abut a hatched or roughened surface of the first polyvinyl butyral sheet. Also alternatively, the first polyurethane film can be hatched or roughened on both surfaces. Furthermore, the second polyvinyl butyral sheet can be hatched or roughened on both surfaces, and the second polyurethane film can be woven on one surface and smooth on its opposing surface, with either the smooth or hatched or roughened surface of the first polyurethane film abutting a hatched or roughened surface of the first polyvinyl butyral sheet. Alternatively, the second polyurethane film can be woven on both surfaces.

The first superposed layer assembly with the aforementioned rigid plate and the second superposed layer assembly can respectively be subjected to the action of an autoclave which has an initial temperature of at least approximately 35° C. The first and second superposed layer assemblies are preferably continuously subjected to a temperature of at least approximately 35° C. between the end of the step of calendering the first superposed layer assembly with the aforementioned rigid plate and the beginning of the step of subjecting the second superposed layer assembly to the action of an autoclave.

The present invention is noteworthy in that the polyester film between the glass and polycarbonate sheets is replaced by a polyurethane film, e.g., an aliphatic polyurethane.

In this way, the superposed layer composite glass structure can be made in a single operation because the polyurethane adheres well to the PVB and also adheres directly to the polycarbonate sheet by a calendering process effected at a temperature approximately in the range of 120° to 200° C. followed by passing it through an autoclave under pressure in the range of 10 to 15 bars.

According to another aspect of the present invention, the superposed layer structure or "sandwich" formed by layering the above-defined elements is surrounded, prior to the calendering process, by crossed bands each made of a thermo-retractable material, e.g., a glass material having an adhesive surface.

In this way, the polycarbonate plate can be prevented from deforming.

However, experience has shown that in presently known ovens or furnaces, which disadvantageously are capable only of "all or nothing" adjustment, are not suitable for implementation of the above-described calendering process, because they emit a very large amount of infrared radiation which heats the internal elements of the "sandwich" to a temperature much higher than the ambient temperature of the oven.

As a result, the polycarbonate plate is overheated and loses various desirable physical qualities.

An attempted solution moving the "sandwich" more quickly through the oven has not given good results because in this case, the innermost layers of polyvinyl butyral and polyurethane film are not heated to a proper or effective temperature.

These phenomena are explained in that the thinner a sheet of plastic is formed, the more easily it is traversed by radiation.

Consequently, a polycarbonate plate having a thickness of several millimeters is heated more rapidly than a sheet of butyral having a thickness of approximately 0.4 millimeters.

According to one aspect of the present invention, the above-described shortcomings are substantially overcome or mitigated by manufacturing a superposed layer composite glass structure in the following three phases. The first includes forming a first superposed layer or sandwich assembly including a polycarbonate plate, a polyurethane film, a sheet of polyvinyl butyral and a plate of glass and subjecting the sandwich to a calendering process. The second includes superposing on the glass plate other glass plates and interposing polyvinyl butyral sheets between adjacent glass sheets, with the resulting second superposed layer or sandwich assembly being subjected to a calendering process. The third includes subjecting the second superposed layer assembly to the action of an autoclave.

In this way, it is possible to use presently known ovens without risking altering physical qualities of the polycarbonate.

BRIEF DESCRIPTION OF THE FIGURES

The invention will be better understood by the following description made with reference to the annexed drawings which are given merely by way of non-limiting example wherein.

DETAILED DESCRIPTION OF THE INVENTION

Figure 1:
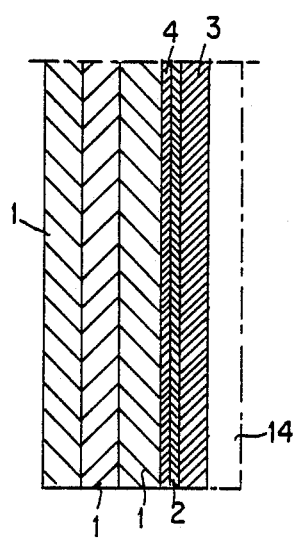
FIG. 1 is a schematic cross-sectional view showing one embodiment of a protective composite glass structure according to the present invention.

Referring to the drawings and in particular to FIG. 1, a superposed layer composite glass structure is illustrated which is formed by layering or superposing of glass plate 1, which is preferably laminated, polyurethane film 2 and polycarbonate plate 3. A polyvinyl butyral sheet 4 is interposed between glass plate 1 and polyurethane film 2.

Laminated glass plate 1 is preferably approximately 20 to 30 millimeters thick. Polyvinyl butyral sheet 4 is preferably approximately 0.4 millimeters thick and polyurethane film 2 is preferably approximately 0.38 to 0.6 millimeters thick. Polycarbonate plate 3 is at least 2 millimeters thick and, preferably, is 3 millimeters thick.

The polyurethane film is either a polyether or polyester aliphatic polyurethane.

Figure 2:
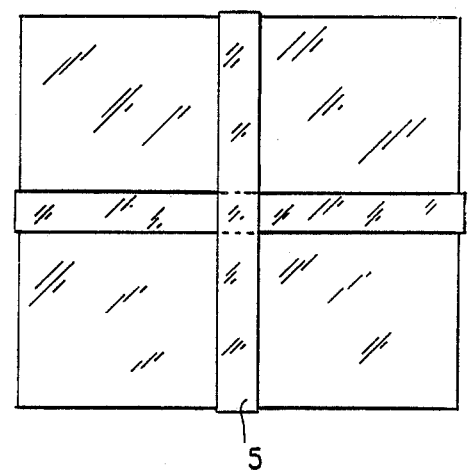
FIG. 2 is a view of a composite glass illustrating an aspect of the construction process according to the present invention.

The above-described superposed layer assembly is surrounded, as shown in FIG. 2, according to two directions perpendicular and parallel to is surfaces, by bands 5 formed of a slightly thermo-retractable material, such as a glass material, having an adhesive surface. In other words, bands 5 are placed, as shown in FIG. 2, around the assembly on the surfaces thereof; bands 5 are arranged such that they are substantially perpendicular (e.g., in the range of 80° to 100°) to each other and parallel to the surfaces of the superposed layer assembly. The assembly with surrounding bands 5 then undergoes a calendering or other pressing operation in a tunnel oven which is heated to a temperature between 120° to 200° C. so as to effect a pre-gluing.

Specifically, the tunnel oven is approximately 12 meters in length, and the speed of movement through the oven is approximately 0.50 to 1.5 meters per minute. An optimal result is obtained with a temperature of 170° C. for a speed of 0.6 meters per minute.

Next, the entire assembly is passed through an autoclave or other superheated pressurized steam system under a pressure of 10 to 15 bars and at a temperature approximately in the range of 120° to 200° C. for a period of approximately four to seven hours. Preferably, the temperature is 130° C.; at this temperature, the superposed layer composite glass structure or assembly must be maintained for at least two hours in the autoclave. When the superposed layer assembly has cooled down, bands 5 are removed.

Figure 3:
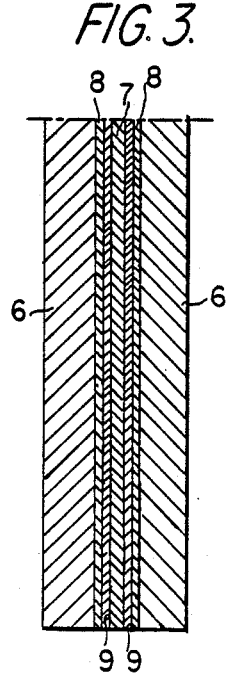
FIG. 3 is a schematic cross-sectional view showing a second embodiment of the composite glass of the present invention.

FIG. 3 shows a second embodiment of the superposed layer composite glass assembly according to the present invention which includes two exterior glass plates 6, a central polycarbonate plate 7, with a polyvinyl butyral sheet 8 and a polyurethane film 9 being provided between plate 7 and each exterior plate 6.

The thickness of the assembly according to this second embodiment is approximately 12 millimeters, and the manufacturing process thereof is the same as that described for the first embodiment.

Figure 4:
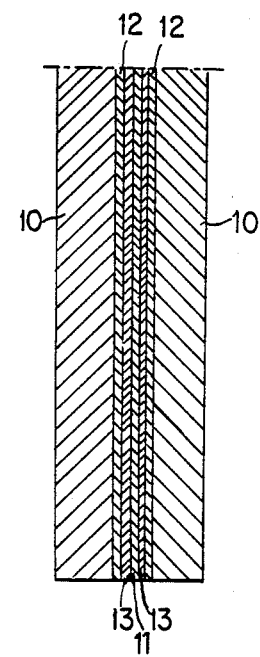
FIG. 4 is a schematic cross-sectional view showing a third embodiment of the composite glass according to the present invention.

FIG. 4 shows a third embodiment of the protective superposed layer composite glass structure according to the present invention which includes two exterior glass plates 10 each having a thickness of 6 to 50 millimeters, and a center polyester film 11, having a thickness on the order of 175 to 600 microns. The composite structure according to this third embodiment is held together by means of polyvinyl butyral sheets 12 and polyurethane films 13, as shown in FIG. 4. The method of manufacture is also the same as that described in the first embodiment.

Glass plate 1 can be formed by layering glass plates as shown in FIG. 1, with a polyurethane film (not shown) being interposed between adjacent glass plates.

To prevent deformation of polycarbonate plate 3 during calendering, rigid plate 14 is attached on the exterior surface of plate 3 polycarbonate as shown in FIG. 1. Plate 14, which is held by bands 5 during the manufacturing process, is made of a material, such as glass, through which infrared radiation can pass. The removal of bands 5 at the exit of the autoclave determines that of plate 14. In other words, the plate 14, which is preferably glass, is placed against plate 3 to form a composite glasswork which is maintained in position by bands 5. After removal from the autoclave, the glasswork is finished and the bands are removed to permit separation of the glasswork from the protective plates.

The thickness of plate 14 is preferably at least four millimeters.

Figure 5:
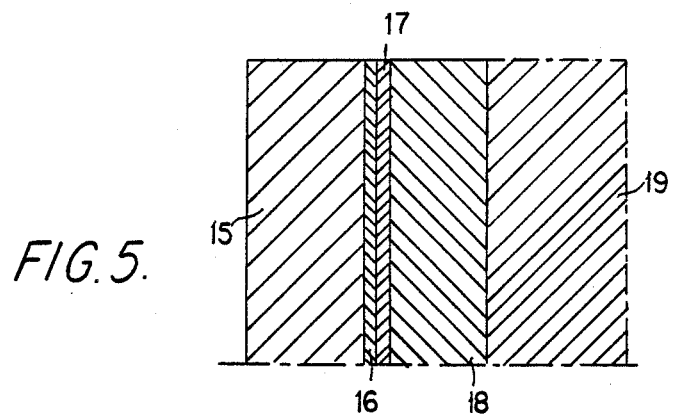
FIG. 5 is a cross-sectional view showing the first phase of a method of manufacturing according to the present invention.
Figure 6:
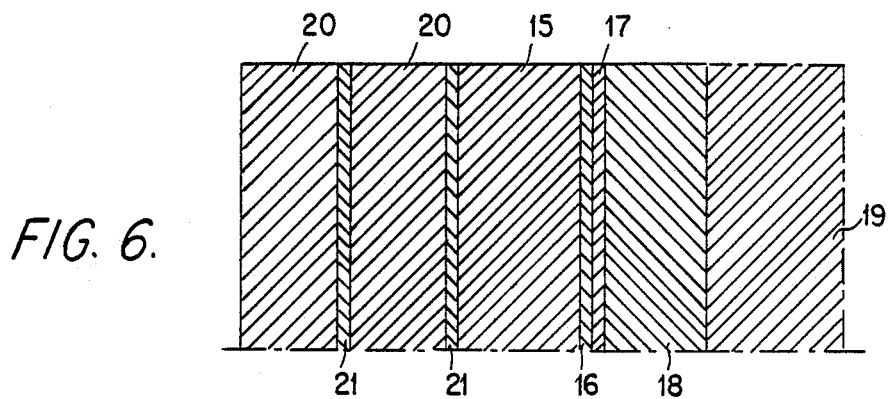
FIG. 6 is a view illustrating the second phase of the manufacturing method according to the present invention.
Figure 7:
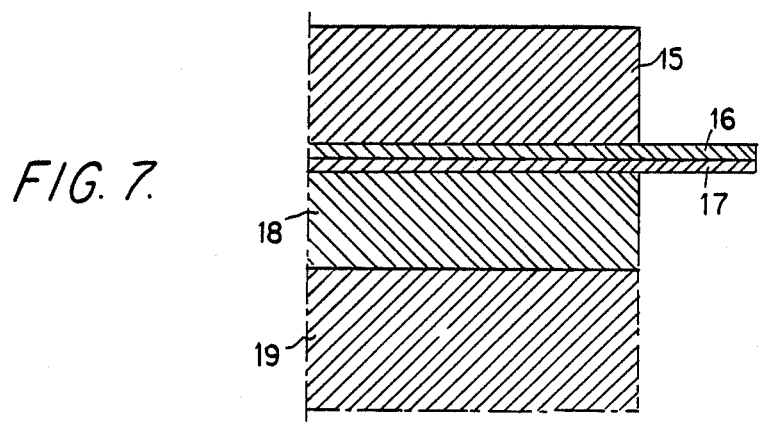
FIG. 7 is a cross-sectional showing another embodiment of the manufacturing method according to the present invention.

FIGS. 5–7 illustrate a multi-stage process of manufacturing a superposed layer composite glass structure according to the present invention.

The first phase or stage of the process includes forming a superposed layer structure or "sandwich" which includes a glass plate 15, a polyvinyl butyral sheet 16, a polyurethane film 17 and a polycarbonate plate 18.

As described above, glass plate 19, for example, is attached to plate 18 and is eventually, i.e., in the third phase, maintained by thermo-retractable bands, like bands 5 shown in FIG. 2, but which are not shown in FIGS. 5–7.

As shown in FIG. 6, several glass plates 20 between adjacent pairs of which polyvinyl butyral sheets 21 may be used in lieu of one glass plate 15, shown in FIG. 5 interposed.

The superposed layer assembly or structure is then placed in a calendering oven. Preferably, the heating elements of the oven are located above the composite glass structure placed therein.

Experience has shown that the ambient temperature of the oven should be approximately 175° C., and that the superposed layer structure or sandwich should have, when it exits from the oven, an external temperature of approximately 60° to 90° C.

The second phase of the process includes adding glass plates 20 onto glass plate 15 by inserting a polyvinyl butyral sheet 21 between plate 15 and plates 20 and then passing the structure thus formed through a calendering oven such that upon removal from the oven, the external temperature of the glass is approximately 50° C.

The third phase of the process includes placing the superposed layer structure or sandwich of FIG. 2, i.e., with bands 5 surrounding the superposed layer assembly, into an autoclave. In other words, the multi-stage process of manufacturing a superposed layer composite glass structure illustrated in FIGS. 5–7 involves providing a first superposed layer assembly including a first glass plate, a first polyurethane film superposed with the first glass plate, a first polyvinyl butyral sheet disposed between the first glass polyurethane film to the first glass plate, and a polycarbonate plate superposed against the polyurethane film; placing a rigid plate formed of a material through which infrared radiation can pass against the polycarbonate plate, surrounding the superposed layer assembly and the rigid plate with a least two bands formed of a thermo-retractable material; calendering the first superposed layer assembly and the rigid plate; removing the bands; providing a second superposed layer including the first superposed layer assembly, a second glass plate superposed with the first glass plate and a second polyvinyl butyral sheet disposed between the fist glass plate and the second glass plate for attaching the first and second glass plates to one another; surrounding the second superposed layer assembly with at least two bands formed of a thermo-retractable material; calendering the second superposed layer assembly; and subjecting the second superposed layer assembly to the action of an autoclave; and removing the bands.

According to one embodiment of the method of manufacture according to the present invention, the autoclave is first placed under pressure of approximately 8 to 15 bars, the superposed layer structure with surrounding bands 5 are placed in the autoclave, and then the structure with bands 5 are subjected to successive levels of temperature in the autoclave.

For a first temperature level, the temperature of the autoclave is brought to approximately 100° C. for approximately 10 minutes, followed by a second temperature level of approximately 120° C. for a duration of 15 minutes, and, finally, a last temperature level of approximately 130° C. for a duration of 40 to 50 minutes. Finally, the pressure in the autoclave is slowly lowered while the assembly remains therein to prevent an abrupt cooling down of the superposed layer assembly.

According to another embodiment of the method of manufacture according to the present invention, good results can be obtained by subjecting the superposed layer composite to the action of the autoclave at a temperature of approximately 115° C. for one hour. It is known that calendering brings about a pre-gluing of the contacting plates, sheets or films. Permanent adherence, however, is not assured until the composite structure has passed through the autoclave.

For various reasons, desirable results can be achieved by allowing a certain amount of time to pass between the above-defined first and second phases. In this case, the first phase is immediately followed by passing the superposed layer assembly through the autoclave; i.e., structure 15–18 is passed through the autoclave prior to both adding glass plates 20 onto plate 15 with PVB sheet 15 interposed therebetween and subsequently calendering this modified assembly.

According to another embodiment of the manufacturing process of the present invention, the final composite glass structure can be made by means of two connected glasses, each formed according to the process of the invention, and one including elements 15–18 and, the other including glass plates 20 glued together by polyvinyl butyral, as shown in FIG. 6. The joining of the two elementary connected glasses is accomplished by means of a polyvinyl butyral sheet 21 through calendering and passing the composite structure through an autoclave.

A superposed layer composite glass structure formed according to the process of the present invention can include the following elements:

A glass plate approximately 3 to 5 millimeters thick;
A polyvinyl butyral sheet approximately 0.38 millimeters thick;
A second glass plate approximately 10 to 15 millimeters thick;

A polyvinyl butyral sheet approximately 0.38 millimeters thick;

A third glass plate approximately 10 to 15 millimeters thick;

A thick butyral sheet approximately 1.52 to 3.04 millimeters thick;

A polyurethane film approximately 0.45 millimeters thick; and

A polycarbonate plate approximately 500 microns to 12 millimeters thick.

The process of the present invention also provides for modifying the method of layering the elements as follows.

According to the present conventional techniques, the butyral plates and the polyurethane sheet have dimensions greater than those of glass plates 15 and 19 and polycarbonate plates 18, the excess material being removed when the layering has been done. But, it has been noted that a glass thus formed has faults at its periphery due most likely to shrinking of the plastic elements (butyral and polyurethane).

According to the present invention, the polyvinyl butyral and the polyurethane are allowed to surpass the edge of the glass and polycarbonate plates by approximately one centimeter, as shown in FIG. 7, while the superposed layer assembly or sandwich undergoes a calendering operation. The excess material is removed when the sandwich assembly comes out of the calendering oven prior to placement in the autoclave, whereas in heretofore known conventional techniques, the excess material has been removed prior to the calendering tep.

The process of the invention is improved by using butyral sheets hatched or roughened to exhibit a text "woven" on both surfaces, i.e., which have projections on both surfaces, and a plyurethane film hatched or roughened to exhibit a "woven" texture on one surface, with the smooth surface of the polyurethane film being placed against the hatched surface of the butyral sheet and hence with the hatched surface of the polyurethane film being placed against the polycarbonate plate. Alternatively, a polyurethane film which has been hatched on both sides can be used so that woven surfaces of the polyurethane film are placed against both the polycarbonate plate and a hatched surface of the butyral sheet. Of course, the butyral sheets could alternatively be hatched on only one surface.

The process of the present invention is improved if the composite glass structure is maintained, when coming out of the calendering oven, at a temperature not less than approximately 35° to 40° C.; the temperature of the composite glass structure should not fall below this value between the time when the glass structure comes out of the oven and when it is introduced into the autoclave.

From the foregoing description, one skilled in the art can easily ascertain the essential characteristics of the present invention and, without departing from the spirit and scope thereof, can make various changes and modifications of the invention to adapt it to various usages and conditions. Accordingly, the present invention is not limited to the embodiments described and illustrated herein, but extends to all variations in forms and dimensions. Thus, for example, the process of the present invention can be applied to formation of composite glass structures comprising several polycarbonate plates.

What is claimed is:

1. A process for making a protective superposed layer composite glass structure comprising:
    (a) providing a superposed layer assembly including a first glass plate, a first polyurethane film superposed with said first glass plate, a first polyvinyl butyral sheet disposed between said first glass plate and said first polyurethane film for attaching said first polyurethane sheet to said first glass plate;
    (b) providing a polycarbonate plate superposed on one end of said superposed layer assembly adjacent said first polyurethane film;
    (c) pressing a rigid plate formed of a material through which infrared radiation can pass against the exterior surface of said polycarbonate plate;
    (d) surrounding said superposed layer assembly, said polycarbonate plate, and said rigid plate with at least two bands formed of a thermo-retractable material;
    (e) subjecting said superposed layer assembly, said polycarbonate plate, and said rigid plate surrounded by said bands to a calendering operation;
    (f) subjecting said superposed layer assembly, said polycarbonate plate, and said rigid plate surrounded by said bands to the action of an autoclave; and
    (g) removing said bands from around said superposed layer assembly, said polycarbonate plate and said rigid plate and separating said rigid plate from said polycarbonate plate and said superposed layer assembly subsequent to autoclaving.

2. The process as recited in claim 1 wherein said bands are spaced approximately in the range of 80° to 100° with respect to each other around said superposed layer assembly.

3. The process as recited in claim 1 wherein said bands are formed of a glass material.

4. The process as recited in claim 1 wherein said superposed layer assembly surrounded by said bands are calendered at a temperature approximately in the range of 120° to 200° C.

5. The process as recited in claim 1 wherein said superposed layer assembly surrounded by said bands are subjected to aid autoclave at a temperature approximately in the range of 120° to 200° C. under a pressure approximately in the range of 10 to 15 bars.

6. The process as recited in claim 1 wherein said rigid plate is at least 4 millimeters thick.

7. The process as recited in claim 1, wherein said bands of thermo-retractable material include an adhesive surface.

8. The process as recited in claim 1, wherein said polyvinyl butyral sheet extends beyond the edges of said first glass plate, said polycarbonate plate and said rigid plate as excess polyvinyl butyral material, and wherein the process further comprises removing said excess polyvinyl butyral material subsequent to said calendering step.

9. The process as recited in claim 1, wherein said polyvinyl butyral sheet is provided with hatched surfaces.

10. The process as recited in claim 8, wherein said polyurethane film has a substantially smooth surface and a hatched surface and said smooth surface abuts a hatched surface of said polyvinyl butyral sheet.

11. A process for preparing a protective superposed layer composite glass structure comprising the steps of:
    (a) providing a first superposed layer assembly including a first glass plate, a first polyurethane film superposed with said first glass plate, a first polyvinyl butyral sheet disposed between said first glass plate and said first polyurethane film for attaching said first polyurethane film to said first glass plate, and a polycarbonate plate superposed against said polyurethane film;
(b) placing a rigid plate against said polycarbonate plate, said rigid plate being formed of a material through which infrared radiation can pass;
(c) surrounding said superposed layer assembly and said rigid plate with at least two bands formed of a thermoretractable material;
(d) calendering said first superposed layer assembly and said rigid plate;
(e) removing said bands;
(f) providing a second superposed layer comprising said first superposed layer assembly, a second glass plate superposed with said first glass plate and a second polyvinyl butyral sheet disposed between said first glass plate and said second glass plate for attaching said first and said second glass plates to one another;
(g) surrounding said second superposed layer assembly with at least two bands formed of a thermoretractable material;
(h) calendering said second superposed layer assembly
(i) subjecting said second superposed layer assembly to the action of an autoclave; and
(j) removing said bands.

12. The process as recited in claim 11 wherein said rigid plate is formed of a glass material.

13. The process as recited in claim 11 further comprising after step (c), subjecting said first superposed layer assembly and said rigid plate to the action of an autoclave.

14. The process as recited in claim 13 wherein said subjected to the action of an autoclave comprises initially pressurizing said autoclave and subsequently creating successive temperature levels in said autoclave.

15. The process as recited in claim 14 comprising pressurizing said autoclave to a pressure in a range of about 8 to 15 bars and subsequently creating three temperature levels at about 100° C., 120° C. and 130° C. in said autoclave.

16. The process as recited in claim 15 comprising maintaining a temperature level at about 100° C. for approximately ten minutes, maintaining a temperature level at about 120° C. for approximately fifteen minutes, and maintaining a temperature level at about 130° C. for a time in the range of about forty to fifty minutes.

17. The process as recited in claim 16 comprising slowly lowering the pressure in said autoclave subsequent to maintaining a temperature level at about 130° C. for a time in the range of about forty to fifty minutes.

18. The process as recited in claim 11 wherein said first and said second superposed layer assemblies are provided such that said first and second polyvinyl butyral sheets and said first polyurethane film extend beyond the edges of said first and third glass plates, said polycarbonate plate and said rigid glass plate, and the extending portions of said first and second polyvinyl butyral sheets and said polyurethane film are removed after each of steps (c) and (e).

19. The process as recited in claim 11 comprising providing said first superposed layer assembly with a first polyvinyl butyral sheet hatched on both surfaces.

20. The process as recited in claim 19 further comprising providing said first superposed layer assembly with a first polyurethane film hatched on one surface and smooth on its opposing surface, said smooth surface of said first polyurethane film abutting said first polyvinyl butyral sheet.

21. The process as recited in claim 13, comprising exposing said first superposed layer assembly and said second superposed layer assembly to a temperature of at least 35° C. between the end of step (c) and the beginning of step (f).

* * * * *